United States Patent [19]
Jusinskas, Jr. et al.

[11] 3,985,974
[45] Oct. 12, 1976

[54] POWER FAIL MONITOR AND TRANSFER CIRCUIT

[75] Inventors: Julius Jusinskas, Jr., Glenn Ellyn; Lloyd L. Langsdorf, Streamwood, both of Ill.

[73] Assignee: GTE Automatic Electric Laboratories Incorporated, Northlake, Ill.

[22] Filed: Dec. 22, 1975

[21] Appl. No.: 642,955

[52] U.S. Cl. .................. 179/18 AD; 179/27 G; 179/175.3 S
[51] Int. Cl.² ........................................ H04M 3/42
[58] Field of Search ........ 179/18 AD, 27 G, 27 CA, 179/175.2 C, 175.3 R, 175.3 S

[56] References Cited
UNITED STATES PATENTS

| | | | |
|---|---|---|---|
| 3,506,789 | 4/1970 | Brockschmidt et al. | 179/18 AD |
| 3,854,012 | 12/1974 | Chambers | 179/18 AD |
| 3,927,272 | 12/1975 | Bloxham et al. | 179/18 AD |

*Primary Examiner*—Douglas W. Olms
*Attorney, Agent, or Firm*—Robert J. Black

[57] ABSTRACT

Generally, the power fail monitor and transfer circuit of the present invention provides four metallic transmission loops from the subscribers on the private branch exchange to four dedicated trunk lines to the central office. The central office battery is utilized as the transmission media and, on incoming calls, the central office extends ringing current directly to the private branch exchange subscribers. The metallic transmission loops are automatically provided during a failure, and, during power restoration, any interruption of existing telephone conversations is effectively prevented by monitoring the current flow in the transmission path, by means of optical couplers.

9 Claims, 4 Drawing Figures

POWER FAIL MONITOR AND TRANSFER CIRCUIT

BACKGROUND OF THE INVENTION

This invention relates to a power fail monitor and transfer circuit for use in a private branch exchange, to provide means for placing or receiving calls outside the private branch exchange during a failure, such as a commercial power failure, an internal component or software failure, or an internal DC supply failure.

It is common practice to provide means at a private branch exchange whereby, in the event of a failure of the above-described type, one or more pre-designated stations of the private branch exchange will be cut through directly to the central office where an auxiliary power supply is available. The means, generally a power fail transfer scheme or arrangement, normally used have at least one drawback which is far less than satisfactory. For example, with most of these schemes, during power restoration, any conversation on the established power fail loop is cut off. More particularly, most present power fail transfer schemes provide at least one and usually more metallic transmission loops from the subscribers on the private branch exchange to a dedicated trunk line or lines to the central office. The central office battery is then utilized as the transmission media and on incoming calls the central office extends ringing current directly to the private branch exchange subscriber. When power is restored, these metallic transmission loops are automatically opened, so that any conversation on a transmission loop is cut off. An arrangement having this drawback is disclosed in, for example, U.S. Pat. No. 3,506,789.

Accordingly, it is an object of the present invention to provide an improved power fail monitor and transfer circuit.

A more specific object is to provide such a power fail monitor and transfer circuit wherein existing telephone conversations are not interrupted during power restoral.

A feature of the power fail monitor and transfer circuit is that the trunk circuit can be automatically busied out so that, upon power being restored, the trunk circuit is marked busy to the central processor to thus prevent the central processor from attempting to seize the trunk circuit.

SUMMARY OF THE INVENTION

Generally, the power fail monitor and transfer circuit of the present invention provides four metallic transmission loops from the subscribers on the private branch exchange to four dedicated trunk lines to the central office. The central office battery is utilized as the transmission median and, on incoming calls, the central office extends ringing current directly to the private branch exchange subscribers. The metallic transmission loops are automatically provided during a failure, and, during power restoration, any interruption of existing telephone conversations is effectively prevented by monitoring the current flow in the transmission path, by means of optical couplers.

BRIEF DESCRIPTION OF THE DRAWINGS

A full understanding of the arrangement contemplated by the invention as well as an appreciation of the various advantageous features thereof may be gained from consideration of the following detailed description in connection with the accompanying drawings in which:

FIG. 4 is a view generally illustrating the manner in which FIGS. 2 and 3 are assembled.

DETAILED DESCRIPTION

While the illustrated embodiment of the power fail monitor and transfer circuit provides four metallic transmission loops from the subscribers on the private branch exchange to four dedicated trunk lines to the central office, any number of such transmission loops can be provided. A normally operated power fail transfer relay PFT having contacts PFT-a through PFT-g is included in each of the respective ones of the metallic transmission loops for automatically establishing them in the event of a failure.

Figure 1:
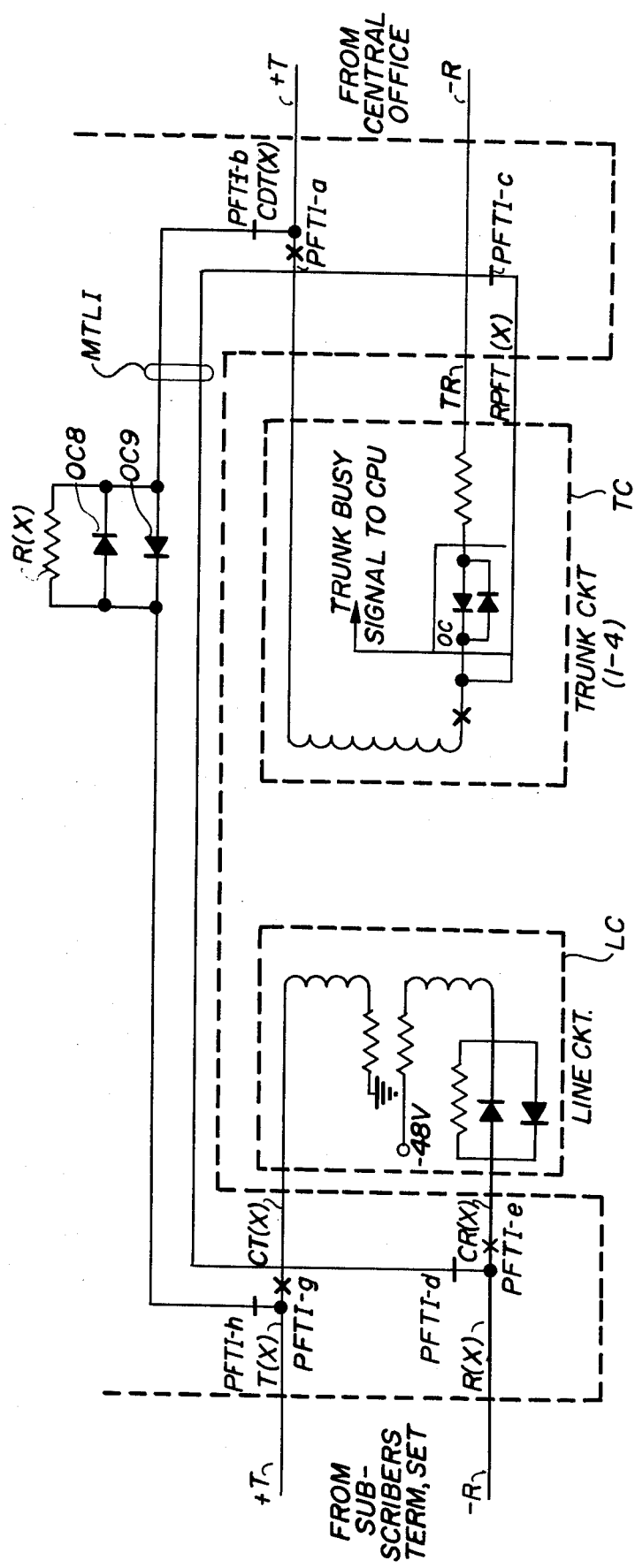
FIG. 1 is a schematic generally illustrating the manner in which the power fail monitor and transfer circuit establishes one of the four metallic transmission loops from the subscribers on the private branch exchange to one of the four dedicated trunk lines to the central office.

In FIG. 1, the metallic transmission loop including the power fail transfer relay PFT1 is illustrated, in conjunction with a line circuit LC and a trunk circuit TC, by means of which a transmission loop normally is established between a subscriber and a central office. While only the one transmission loop including the power fail transfer relay PFT1 is illustrated, it will be appreciated that each of the other metallic transmission loops including the power fail transfer relays PFT2 – PFT4 is the same.

The metallic transmission loop is generally indicated as MTL1 and, as more fully described below, it is automatically established during a failure, when the power fail transfer relay PFT1 restores, via its contacts PFT1-a through PFT1-g. A pair of optical couplers represented by the diodes OC8 and OC9, are included in one of the conductors of the transmission loop, and these optical couplers monitor the current flow in the transmission loop and prevent the metallic transmission loop from being interrupted, during power restoration.

Figure 2:
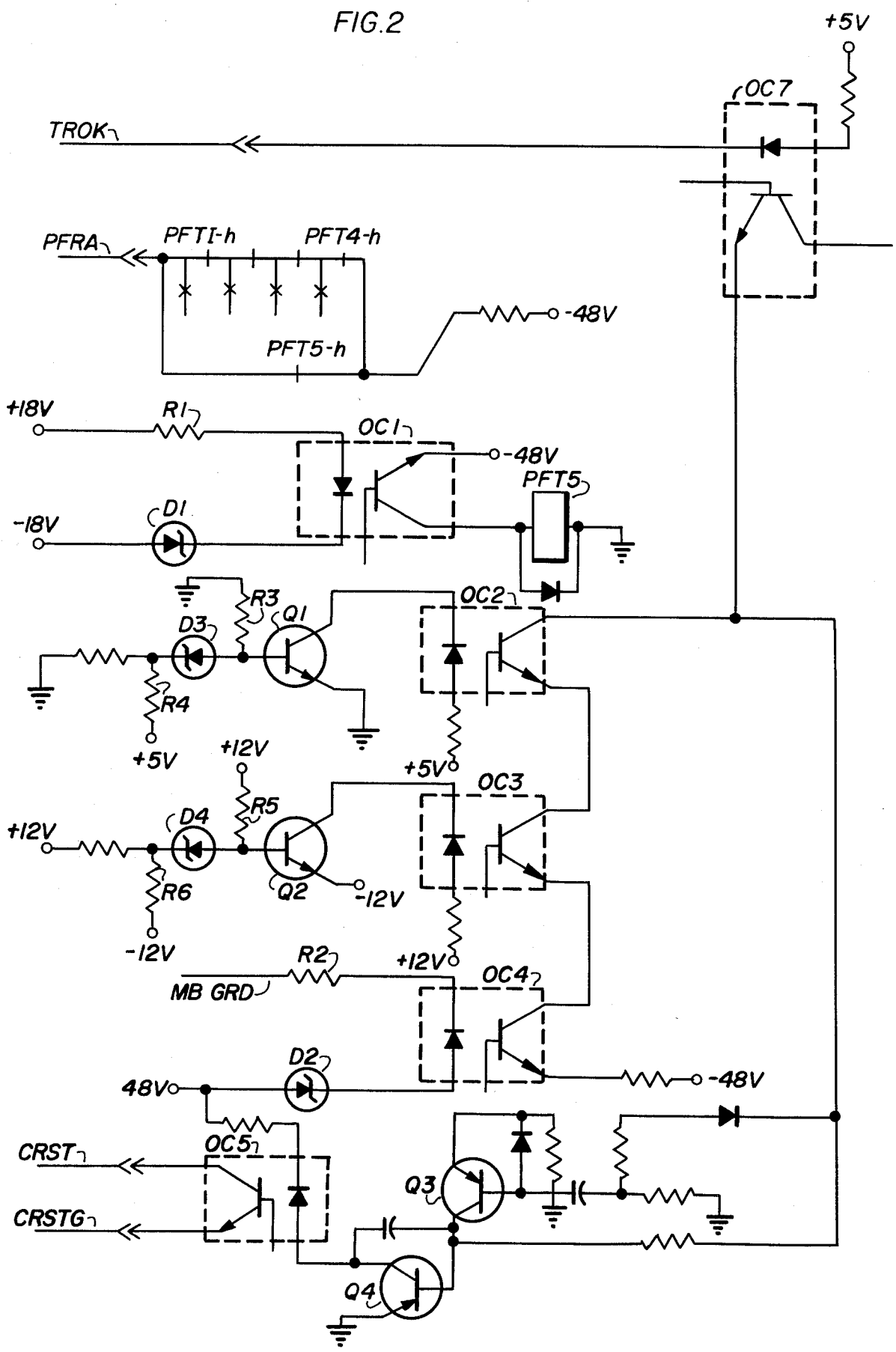
FIGS. 2 and 3, when assembled as illustrated in FIG. 4, is a schematic of the power fail monitor and transfer circuit.
Figure 3:
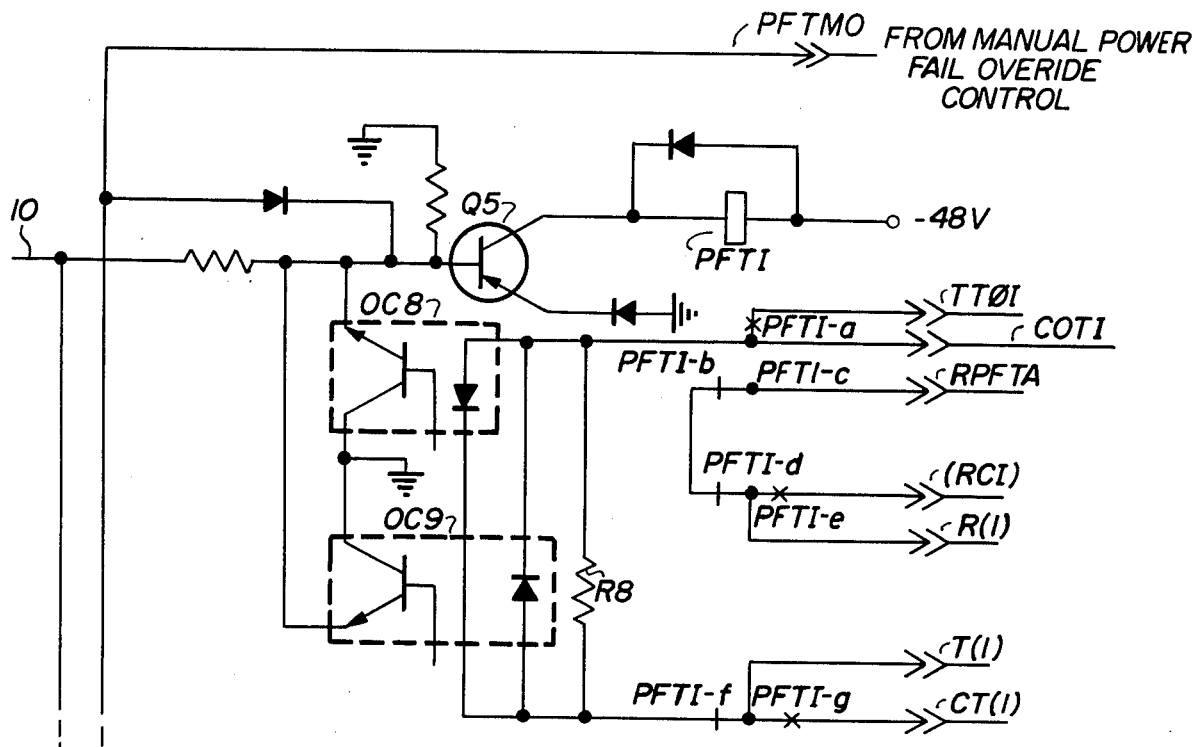
Figure 3:
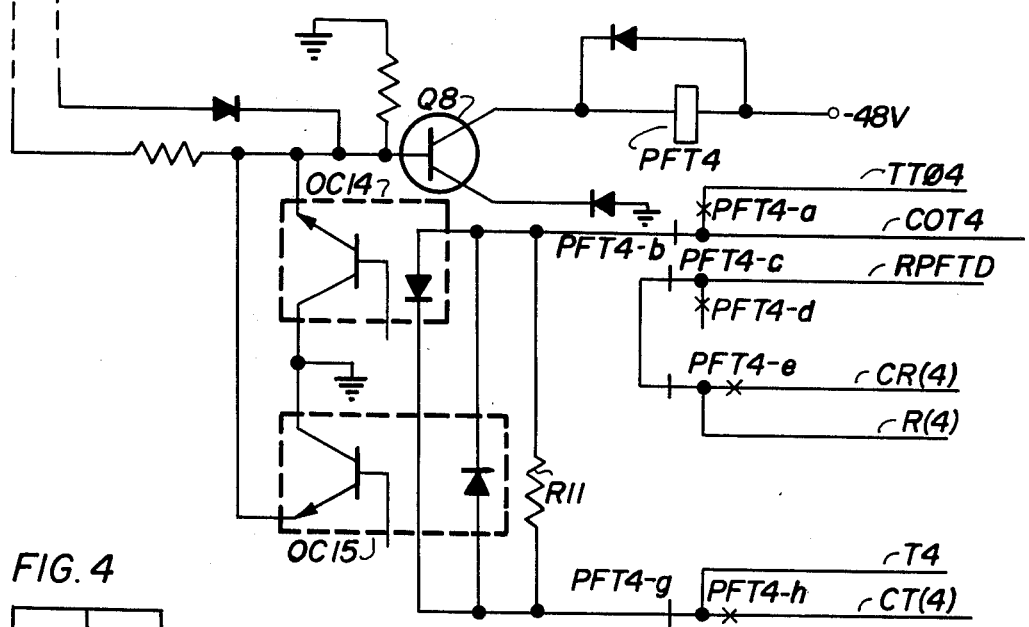
Figure 4:
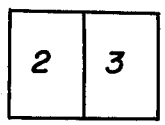

Referring now to FIGS. 2 and 3, the power fail monitor and transfer circuit can be more fully appreciated, and the manner in which the metallic transmission loops are established and prevented from being interrupted during power restoration, if any one of them is being used at the time of power restoration, can be better understood.

More particularly, in FIG. 3, two of the four power fail transfer relays PFT1–PFT4 are shown, together with their associated contacts for automatically establishing, during a failure, the metallic transmission loops, as illustrated in FIG. 1. These power fail transfer relays PFT1–PFT4, in the illustrated embodiment, are HQA type relays, and are normally operated as a result of the current flow through them, as provided by the normally conductive relay driver transistors Q5–Q8, respectively. The relay driver transistors Q5–Q8 normally are biased conductive via a bias voltage coupled to their respective bases, via the lead 10, as more fully described below. Generally, however, this bias voltage is coupled to the relay driver transistor Q5–Q8 to maintain them conductive, until a failure is detected.

In the event of a failure, the bias voltage for the relay driver transistors Q5–Q8 is removed, and they are rendered non-conductive and, in turn, cut-off the current flow through the power fail transfer relays PFT1–PFT4, thus causing them to drop. In doing so, the metallic transmission loops from the subscribers on the private branch exchange to the dedicated trunk lines to the central office are automatically established, as generally illustrated in FIG. 1. The central office battery is then utilized as the transmission media, and on incoming calls, the central office extends ringing current directly to the private branch exchange subscriber.

As indicated above, one conductor of each of the metallic transmission loops includes a pair of optical couplers which, in FIG. 1, are represented by the diodes OC8 and OC9. These optical couplers which can be, for example, Photo Darlington relays MCT2 manufactured by Monsanto or their equivalents, are connected in an inverse, parallel arrangement, as can be seen in FIG. 3. With this arrangement, A.C. ringing current on the transmission loop can pass through them from the central office to the private branch exchange subscriber. These optical couplers are activated by the ringing current, and also by D.C. current flow when a D.C. continuity path is established when the subscriber assigned to the transmission loop goes off-hook. When these optical couplers, e.g. OC8 and OC9, are activated, they couple the base of the associated relay driver transistors, e.g. transistor Q5, to ground, thus preventing them from being biased conductive and again operating the power fail transfer relays PFT1–PFT4. The resistors, e.g. R8 and R11, which are represented by the resistance R(x) in FIG. 1, provide for a D.C. shunt.

Accordingly, when power is restored, if a conversation is taking place on any of the transmission loops, the optical couplers included in that transmission loop are activated and prevent the associated relay driver transistor from being biased conductive. The transmission loop therefore is prevented from being interrupted, since its associated power fail relay PFT is prevented from operating. On any transmission loop which is not in use at the time, the bias voltage which is restored on the lead 10 again biases the associated one of the relay driver transistors Q5 and Q8 conductive to, in turn, operate the power fail transfer relay to restore normal operation.

Another feature which is or can be provided as a by-product of the guarded restoral is an automatic busy-out of the associated trunk circuit to prevent it from being siezed by an outgoing call when power is restored. As can be seen in FIG. 1, the metallic transmission path is looped through the trunk circuit TC and the trunk circuit is provided with another optical coupler OC10 of the above-described type which likewise senses or detects the D.C. current flow in the established transmission loop. This optical coupler OC10 on being activated provides a trunk busy signal output to, for example, the system's central processor or CPU, to prevent its scan circuit from selecting that particular trunk circuit for use.

As indicated above, the relay driver transistors Q5–Q8 normally are biased conductive by means of a bias voltage coupled to their base electrodes via the lead 10. The relay driver transistors Q5–Q8, in turn, operate the power fail transfer relays PFT1–PFT4, respectively. This bias voltage on the lead 10 is provided by the monitoring circuitry, and can be provided in various different fashions, depending upon the power supplies, components, software, etc. being monitored. The only requirement is that during normal operation, i.e., no failures, the bias voltage is coupled to the relay driver transistors Q5–Q8, and that this bias voltage be removed when a failure is detected. This could be accomplished simply by providing a relay which is normally held operated to couple the bias voltage to the lead 10 and which, upon the occurrence of a failure, is caused to restore or drop out, thereby removing the bias voltage.

The power fail monitor and transfer circuit can be utilized to monitor any power supply, software, component, or the like which would effect placing or receiving calls outside of the private branch exchange. In this illustrated embodiment, the +12, −12, +18, −18, +5 and −48 voltage supplies from a system's power supply are monitored, and a failure of the ±18 volt supply does not effect a call processing and is considered a minor alarm.

In particular, in FIG. 2, it can be seen that the ±18 volt supply and the ±48 volt supply are monitored by means of optical couplers OC1 and OC4, respectively, and Zener regulating diodes D1 and D2, in a loop between negative and positive. The current limiting resistors R1 and R2 limit the current flow through the respective optical couplers OC1 and OC4 to approximately 12 milliamperes. The ±12 volt and +5 volt supplies are monitored with resistance voltage dividers comprising resistors R3 and R4 and resistors R5 and R6, respectively, with regulating Zener diodes D3 and D4 as voltage reference switches for turning off the normally conductive transistors Q1 and Q2, respectively, when the voltage drops below an assigned value. The transistors Q1 and Q2, when conductive, in turn, activate the optical couplers OC2 and OC3. The optical coupler OC1 monitoring the ±18 volt supply drives a relay PFT5 which may be a HQA type relay. The optical coupler OC4 monitoring the −48 volt supply is in series with the optical couplers OC2 and OC3, in an emitter-to-base "AND" function, and couple a −48 volt biasing voltage to the lead 10, via the optical coupler OC1.

In the illustrated embodiment, the relay PFT5 has a normally open contact PFT5-1 in series with an output lead PFRA and a −48 volt source. The lead PFRA can, for example, extend to an operator's turret or an external alarm and, thereby, used to indicate or sound a failure of the ±18 volt supply, when the relay PFT5 restores. The power fail transfer relays PFT1–PFT4 also can have contacts which are connected in a series circuit between the −48 volt source and the lead PFRA to indicate or sound an alarm when they all restore, as illustrated.

With the above-described monitoring arrangement, it can be seen that a failure of the +5, ±12 or the ±48 volt supply will result in the −48 volt biasing voltage being removed from the lead 10 to the bases of the relay driver transistors Q5–Q8, thus rendering them non-conductive. With the transistors Q5–Q8 non-conductive, the power fail transfer relays PFT1–PFT4 restore and the metallic transmission loops then are automatically established, as described above.

When power is initially restored, the optical couplers OC1–OC4 again are activated. The relay PFT5 operates and removes the signal on the lead PFRA to the operator's turret or external alarm. The optical couplers OC2–OC4 provide an "AND" function which initiates a signal which, in the illustrated system, is utilized as a tape reload signal.

More particularly, when the optical couplers OC-2–OC4 are activated, a capacitor C1 forming a delay circuit is charged and the transistor Q3 is turned on. The transistor Q3, in turn, keeps transistor Q4 from being turned on, by grounding its base. When the capacitor C1 is charged, transistor Q3 turns off and allows transistor Q4 to turn on. The delay provided is approximately 1.3 seconds. When the transistor Q4 turns on, it drives a 20 milliampere load through the optical coupler OC5 to activate it to, in turn, couple a tape reload or logic signal output to the leads CRST and CRSTG to, in this case, an interrupt circuit of the system's central processor.

Upon receipt of this signal, the central processor returns a hand-shake signal via the lead TROK to activate the optical coupler OC7 to complete the AND function to couple the biasing voltage to the lead 10, to the bases of the relay driver transistors Q5–Q8, to again operate the power fail transfer relays PFT1–PFT4.

It will be appreciated that the monitoring circuit described above is for purposes of illustrating one manner in which various voltage supplies can be monitored and to initiate the power fail transfer in the event of a failure, to establish the metallic transmission loops. Other arrangements also can be utilized, so long as a bias voltage normally is provided to the lead 10 to the bases of the relay driver transistors Q5–Q8 and is removed when a failure results. The optical couplers included in each metallic transmission loop monitors the D.C. current flow in the loop and will prevent the transmission loop from being interrupted upon power being restored, if there is an existing conversation on the transmission loop at the time of restoration. Otherwise, the power fail transfer relays PFT again are operated, to restore normal operation. When the conversation is terminated, the optical couplers are rendered inactive and the ground preventing the associated relay driver transistor is removed so that the power fail transfer relay PFT is operated.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a telephone system including a private branch exchange having a plurality of line circuits and a central office having a plurality of trunk circuits, a transmission loop normally being established between a subscriber on the private branch exchange via an associated one of the line circuits and one of the trunk circuits to the central office, a power fail monitor and transfer circuit for automatically establishing a metallic transmission loop from each of a plurality of said subscribers on the private branch exchange to a corresponding number of said trunk circuits to the central office comprising:
    a. a relay associated with each of said metallic transmission loops, said relays normally being operated and upon being restored establishing said metallic transmission loops,
    b. a relay driver transistor associated with each of said relays and normally biased conductive to operate said relays,
    c. failure monitoring means operative to normally provide a biasing voltage to bias said relay driver transistors conductive to operate said relays and to remove said bias voltage in the event of a failure, and
    d. detector means for detecting current flow associated with each of said metallic transmission loops, each of said detector means upon detecting current flow in its associated metallic transmission loop being operative to inhibit said relay driver transistor associated with said relay associated with said metallic transmission loop from being biased conductive,
    e. whereby conversation existing on any of the metallic transmission loops is prevented from being interrupted by the opening of the metallic transmission loop when a failure is corrected and the biasing voltage again is provided to bias the relay driver transistors conductive.

2. The power fail monitor and transfer circuit of claim 1, wherein said detector means comprise optical couplers.

3. The power fail monitor and transfer circuit of claim 1, wherein said detector means comprise a pair of optical couplers connected in an inverse parallel arrangement so as to permit an A.C. ringing current to pass through the metallic transmission loop with which they are associated.

4. The power fail monitor and transfer circuit of claim 3, wherein said optical couplers are operative to ground the base of the associated one of said relay driver transistor to prevent it from being conductive upon detecting current flow through the metallic transmission loop.

5. The power fail monitor and transfer circuit of claim 1, wherein said detector means comprise a pair of optical couplers connected in parallel so as to be conductive in opposite directions and in series in one of the conductors of said metallic transmission loops, each of said optical couplers being operative to ground the base of the relay driver transistor associated with said metallic transmission loop to thereby prevent said relay driver transistor from being rendered conductive to operate its associated relay.

6. The power fail monitor and transfer circuit of claim 1, further comprising detector means in each of said trunk circuits for detecting current flow through said trunk circuit and said metallic transmission loop, said detector means upon detecting a current flow providing an output signal to busy out said trunk circuit to prevent it from being seized when a failure is corrected and normal operation is established.

7. The power fail monitor and transfer circuit of claim 6, wherein said detector means comprises an optical coupler.

8. The power fail monitor and transfer circuit of claim 1, wherein said failure monitoring means comprising a plurality of power supply monitoring circuits, each of which is adapted to monitor the operation of a different voltage source, said power supply monitoring circuits each including an optical coupler normally operated to couple said biasing voltage to said relay driver transistors and to remove said biasing voltage in the event of a failure of the monitored voltage source.

9. The power fail monitor and transfer circuit of claim 8, wherein said optical couplers in said power supply monitoring means are connected in an AND function.

\* \* \* \* \*